May 22, 1928.
J. L. HARTELL
AXLE GAUGE
Filed May 23, 1925
1,670,889
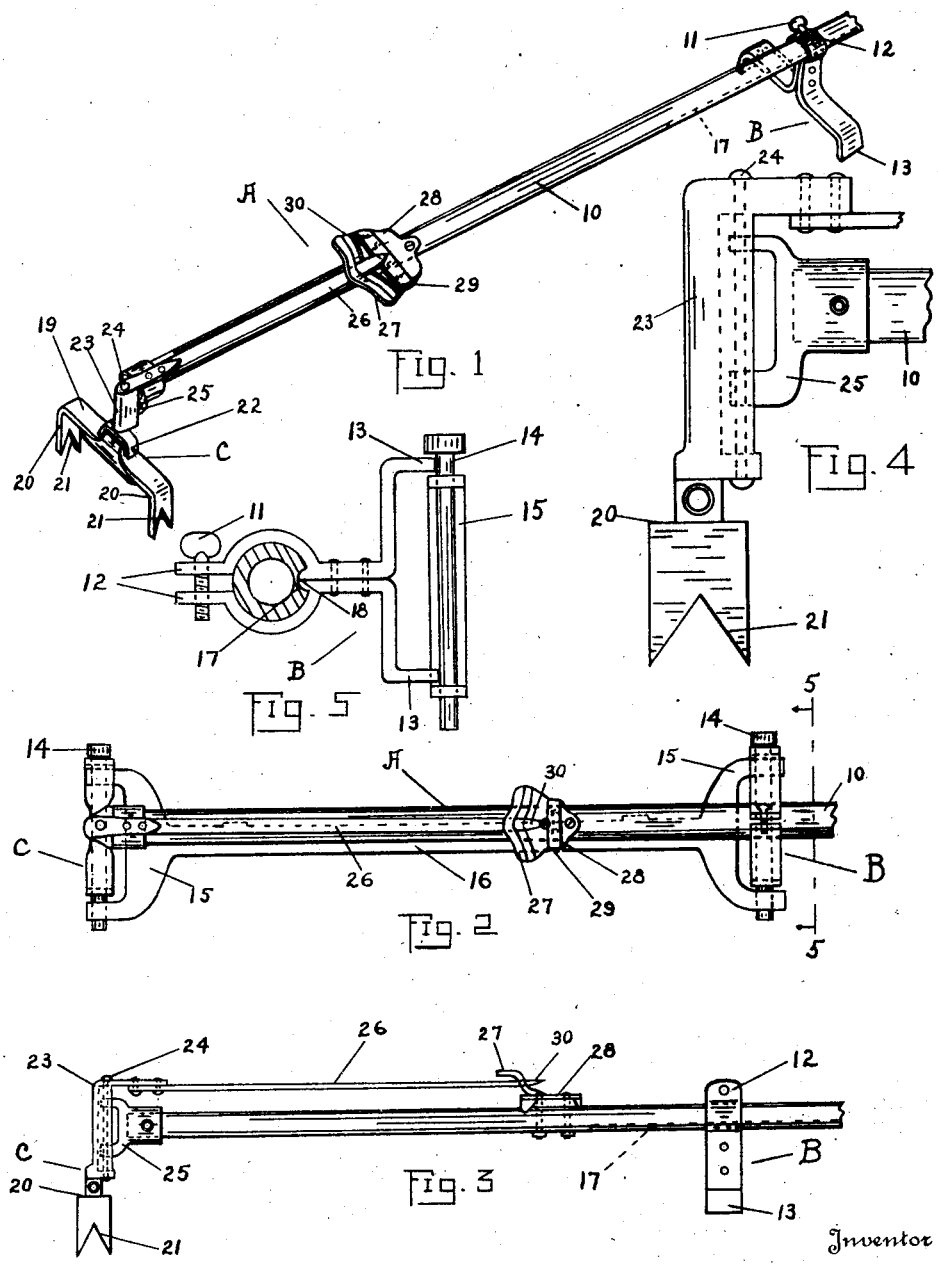
Inventor
Joseph L. Hartell
By Howard Fischer
Attorney Patented May 22, 1928.

1,670,889

UNITED STATES PATENT OFFICE.

JOSEPH L. HARTELL, OF BRAINERD, MINNESOTA.

AXLE GAUGE.

Application filed May 23, 1925. Serial No. 32,293.

My invention relates to improvements in axle gauges particularly adapted for use to true and gauge the axles of automobiles and is designed of a simple, inexpensive construction, yet having an effective structure which will gauge the axle so that it can be trued both to align the spindles of the wheels so that the wheels are set properly from the spindles and to align the axle so that it is true throughout its length.

The simplicity of my invention is quite apparent and it is necessary that it should be simple to make it operate effectively. The invention includes means for engaging the spindles which carry the wheel connection which pivots into the fork of the axle so that if the spindle bolts which carry this connection pivotally, is aligned properly the wheels can be set so that they run true and both set in the same position. This is quite important in automobile wheels, especially in the front steering wheels of the auto.

My invention includes a gauge end or finger which has a considerable length so as to indicate at a glance, even the slightest degree of incorrectness of the spindle bolt of the axle and this is important as these axles must be carefully set, either by a blacksmith or an automobile expert who is familiar with this setting. With my finger gauge, this is quite easily done because of the ready indication by the indicating finger on the gauge, just the exact reading as to the setting and position of the spindle which carries the wheel connection.

It is also a feature of my invention to include means for adjustably setting the gauge for different length axles and thereby permitting it to be adjusted readily and quickly to the size of the axle. When the gauge is set to the desired length it is ready to true up the axle by engaging with the spindles at each end of the same to determine whether or not they are in line and to determine just the position of the spindles so as to support the wheel at the desired angle.

These features together with other peculiar forms and particular construction of my invention will be more fully set forth in the following specification and claims.

In the drawings forming part of my specification:

Figure 1 is a perspective view of my gauge.

Figure 2 is a front view of the same as it would appear in use on an axle testing and gauging the same.

Figure 3 is a bottom view of my gauge.

Figure 4 is an enlarged detail of a portion of my gauge.

Figure 5 is a section on the line 5—5 of the Figure 2, in the direction of the arrows, enlarged to illustrate the detail.

In the drawings my gauge A is designed to provide an axle gauge for automobile axles which can be operated readily by almost anyone even though they are inexperienced in the testing of axles and gauging the same to set them in proper alignment. This provides axle gauge A of a very desirable construction, as it is apparent that the front axles of automobiles often get out of true through an accident, or under strain of use, and thus the wheels do not run true and the automobile driver has difficulty in steering his car. My gauge provides means for setting the axle and trueing the same by testing it and setting it according to the gauge, and thus readily aligning the same to be uniform and to support the wheels in a uniform position on either side of the axle.

The body portion 10 of my axle gauge A is formed of tubing or other suitable material which is trued throughout its length so as to be accurate for use. The body portion 10 is provided with a slidable end gauge member B.

The gauge member B is held slidable across the body 10 and is adapted to be rigidly clamped thereon by the set screw 11 which clamps the free end 12 of the gauge B to the body 10.

The gauge member B is formed with gauge fingers 13 which are spaced apart by the bifurcated or forked portion of the portion B in a manner so that the ends 13 are trued and set in alignment so that they form the engaging ends adapted to engage the spindle 14 which extends through the bifurcated end 15 of the axle 16 in a manner so that the ends 13 will rest against the upper and lower ends of the spindle 14 when the same is raised slightly in the bifurcated end 15 of the axle 16. This permits the gauge ends 13 to rest against the spindle bolt 14 to determine the true position of the bolt 14 so that the axle 16 can be trued so that the bolt 14 will extend true in relation to the axle 16 on both ends of the same. When the bolt 14 is true the ends 13 rest evenly against the bolt 14. This gauge member B, of course, operates in conjunction with the gauge member C which is positioned at the other end of the gauge A and which is adapted to engage with the bolt 14 on the other end of the axle 16 and which will be hereinafter described.

The spindle bolt gauge B is held against rotation on the tubular body 10 by means of the key way 17 cut longitudinally in the surface of the member 10. The key portion 18 formed on the spindle gauge member B engages in the slot or key way 17 of the body 10 of the gauge A. This holds the gauge member B against rotation and keeps it in proper alignment in relation to the gauge at the member C so that the spindle bolt 14 can be aligned in vertical relation to each other.

The gauge member C on the other end of the gauge proper A is formed with a bifurcated portion having ends 20 which are formed with centering notches 21 which are adapted to engage over the bolt 14 in the ends of the axle 16, opposite to the spindle bolt 14 engaged by the member B. These centering notches 21 engage over the bolt 14 in a manner so as to hold the portion or end 19 of the gauge A aligned with the bolt. The end 19 is rigidly secured at 22 to the portion 23 centrally between the ends of the member 19 and extending oppositely to the ends 20.

The portion 23 is pivotally connected by the bolt 24 to the forked end 25 on the end of the body of the gauge A. This permits the portion 23 of the gauge to pivot on the bolt 24 and thus permits the end 20 to pivot about the end 25 of the gauge A and in this manner engage the bolt 14 to indicate the position of the bolt and thus indicate the position of the forked end 15 of the axle 16 when the gauge A is used thereon as indicated in Figure 2 of the drawings.

The portion 23 carries a gauge finger 26 which is of considerable length and the pointed end of which extends under the guard 27 to indicate on the member 28 the exact position of the bolt 14 as it extends in the forked end 15 of the axle 16. Thus the indicating point 30 on the end of the finger 26 indicates on the gauge 29 the exact degree or angle of position of the bolt 14. This gauge 29 can have a zero point at the center and the readings extending from either side thereof as indicated in Figure 1 of the drawings. The guard portion 27 protects the indicating end point 30 of the finger 26, so that it cannot be easily struck or knocked to bend it out of alignment after it is once set in position for operation. This permits the operator of my gauge A to use the same very readily without any material danger of it becoming out of true after it has once been set up for use, and properly gauged.

The pivotal connection of the end 23 which carries the member 19 with the centering notches 21 permits the gauge A to be operated as indicated in Figure 2. The notches 21 engaging over the bolt 14 and thus centering the portion 19 over the ends of the bolt 14, thereby indicating by the finger 26 the exact position of the spindle bolt 14. By turning the gauge A around so that it can engage the bolt 14 on either end, first on one end and then on the other, the reading of both ends of the axle 16 is easily obtained on the gauge 29.

The depth of the notches 21 corresponds to the ends of the gauge portion B, such as 13, so that to indicate the alignment of the axle longitudinally, the notches 21 should engage against the bolt on one end of the axle firmly at top and bottom and the ends 13 should engage firmly against the top and bottom of the bolt 14 on the other end of the axle. This will indicate readily, whether or not the axle is in line throughout its length. The alignment and proper angular setting of the spindles 14 to set the steering wheels of the axle in proper adjustment, is indicated by the finger 26, when the notches 21 are engaged over either of the spindle bolts 14 at the ends of the axle. In this manner, my axle gauge A is readily adaptable to indicate the proper alignment and setting of the axle and the spindle bolts respectively, so that the axle can be trued very easily and in a manner so that it will be absolutely true when aligned with my gauge A, and set thereby. The adjustable end gauge portion B permits the gauge A to be lengthened or shortened to the desired length of the axle to be trued by my gauge. This is important and provides a simple, effective means of operating and adjusting the gauge.

In accordance with the patent statutes I have described the principles of operation of my gauge, and while I have indicated in the drawings a particular formation of the axle gauge, I desire to have it understood that this is only illustrative and that the invention can be carried out by other means and applied to uses other than those above set forth, within the scope of the following claims.

I claim:

1. An axle gauge including a tubular member, there being a key way formed longitudinally in said member, a clamp gauge member adapted to slide on said tubular member and having a portion receivable in said key way, means for clamping said gauge member rigidly on said tubular member, and a pivoted member on the other end of said tubular member adapted to engage over the spindle bolt set in the bifurcated end of an axle, whereby when both ends of said axle gauge are engaging against spindle bolts the alinement of said bolts and the trueness of said axle can be determined.

2. An automobile axle gauge including a tubular member, a forked end supported on one end of said member, a gauge member pivotally secured to said forked end, spindle engaging ends extending from said gauge member, said spindle engaging ends having notches formed therein, a gauge indicating finger carried by said pivoted gauge member and adapted to extend longitudinally along toward the center of said tubular member, a guard adapted to extend over said finger to protect the same, a pointed indicating end on said finger, a gauge positioned beneath said pointed end to indicate degrees thereon, and an adjustable end means on the other end of said tubular member adapted to support said last mentioned gauge so as to indicate the position of the spindle bolt in the bifurcated end thereof.

JOSEPH L. HARTELL.